United States Patent
Peskin et al.

(10) Patent No.: US 8,261,969 B2
(45) Date of Patent: Sep. 11, 2012

(54) METHOD AND APPARATUS FOR CONFIGURING A SURVEY CONTROLLER

(75) Inventors: Christopher Alexander Peskin, Corvallis, OR (US); Nigel Peter Hanson, Christchurch (NZ)

(73) Assignee: Trimble Navigation Ltd., Sunnyvale, CA (US)

( * ) Notice: Subject to any disclaimer, the term of this patent is extended or adjusted under 35 U.S.C. 154(b) by 329 days.

(21) Appl. No.: 12/206,576

(22) Filed: Sep. 8, 2008

(65) Prior Publication Data
US 2010/0059584 A1 Mar. 11, 2010

(51) Int. Cl.
*G06F 17/00* (2006.01)
(52) U.S. Cl. .................... 235/375; 235/487; 235/470
(58) Field of Classification Search ............ 235/375, 235/385, 487, 470; 705/1, 10, 11, 22, 28
See application file for complete search history.

(56) References Cited

U.S. PATENT DOCUMENTS

| | | | |
|---|---|---|---|
| 6,845,913 B2* | 1/2005 | Madding et al. | 235/462.13 |
| 7,286,928 B2 | 10/2007 | Spengler | |
| 7,330,117 B2 | 2/2008 | Ferguson et al. | |
| 7,398,137 B2 | 7/2008 | Ferguson et al. | |
| 2002/0062251 A1* | 5/2002 | Anandan et al. | 705/14 |
| 2003/0078798 A1* | 4/2003 | Zaks et al. | 705/1 |
| 2007/0126579 A1* | 6/2007 | Adams et al. | 340/572.1 |
| 2007/0136077 A1* | 6/2007 | Hammond et al. | 705/1 |
| 2010/0019035 A1* | 1/2010 | Larson et al. | 235/385 |

* cited by examiner

*Primary Examiner* — Edwyn Labaze
(74) *Attorney, Agent, or Firm* — Haynes and Boone, LLP

(57) ABSTRACT

Method and apparatus for configuring a controller for surveying equipment. In one embodiment, an identification tag associated with a surveying tool may be detected by a controller. An indicator related to the identification tag may be presented to a user of the controller. According to another embodiment, operation of the controller may be configured based, at least in part, on the identification tag.

18 Claims, 5 Drawing Sheets

METHOD AND APPARATUS FOR CONFIGURING A SURVEY CONTROLLER

FIELD OF THE INVENTION

The present invention relates in general to a method and apparatus for integrated surveying solutions and more particularly to configuring a controller for surveying equipment.

BACKGROUND

In recent years the number and types of surveying tools has increased. Conventional systems for surveying typically use two or more surveying tools. Such tools may be used to collect data for a broad range of surveying measurements. Conventional methods assume that surveying tools may be interoperable, however this assumption may no longer be valid. For example, conventional systems and methods may not allow operators to easily integrate measurement data. Further, characteristics of the each surveying tools are not typically integrated during such measurements. Conventional methods have attempted to manage data collection using field controllers. However, conventional field controllers are typically configured to operate with a fixed number and type of devices, thus limiting the controllers to a particular set of tools. Further, such controllers are typically configured with user interfaces designed for a particular set of devices. As such, managing certain types of surveying tools may not be achievable. Similarly, surveying measurements may be performed for a broad range of applications often requiring a varying set of surveying tools depending on the measurement type. Users are typically required to identify each surveying tool for operation with a conventional field controller. Such methods may not provide for interoperability with a conventional field controller and are further limited by requiring a user to configure the controller for operation.

While conventional surveying controllers may be used to manage surveying tools, such controllers struggle to meet demands for interoperating with a varying set of survey tools.

BRIEF SUMMARY OF THE INVENTION

Disclosed and claimed herein are a method and apparatus for configuring a controller for surveying equipment. In one embodiment, a controller is configured to detect an identification tag associated with a surveying tool. The controller can present an indicator, related to the identification tag, to a user of the controller. Operation of the controller is configured based, at least in part, on the identification tag.

Other aspects, features, and techniques of the invention will be apparent to one skilled in the relevant art in view of the following detailed description of the invention.

DETAILED DESCRIPTION OF EXEMPLARY EMBODIMENTS

One aspect of the present invention is directed to configuring a controller for surveying equipment. In one embodiment, a controller may be configured to detect an identification tag associated with a surveying tool. For example, a surveying tool may be labeled with an identification tag. According to one embodiment, the identification tag may relate to one of a radio frequency identification (RFID) tag and a barcode tag. The controller may be configured to present an indicator to a user of the controller when an identification tag is detected. According to another embodiment, operation of the controller may be configured based on a detected identification tag, such as a user identification tag. According to another embodiment, this user identification tag may relate to an identification tag associated with a particular user of the controller.

According to another aspect of the invention, a process may be provided for configuring a controller. The process may include detecting an identification tag associated with at least one surveying tool and presenting an indicator, related to the identification tag, to a user of the controller. Further, the process may include configuring operation of the controller to be useable with the surveying tool based on the identification tag. The process may also be configured to detect a user identification for configuration of the controller.

Another aspect of the invention relates to a system for managing data collected by at least one surveying tool. In one embodiment, the system may include a controller configured to interoperate with at least one surveying tool. The controller may perform one or more measurements using at least one of the surveying tools. Further, data collected from the surveying tools, by the controller, may be integrated to provide a surveying measurement. According to another embodiment, the controller may be configured to collect data from a plurality of interoperating surveying tools separately. The system may further include an interface for communication with a data communication network according to another embodiment of the invention.

When implemented in software, the elements of the invention are essentially the code segments to perform the necessary tasks. The program or code segments can be stored in a processor readable medium. The "processor readable medium" may include any medium that can store or transfer information. Examples of the processor readable medium include an electronic circuit, a semiconductor memory device, a ROM, a flash memory or other non-volatile memory, a floppy diskette, a CD-ROM, an optical disk, a hard disk, etc. The code segments may be downloaded via computer networks such as the Internet, Intranet, etc.

Figure 1A:
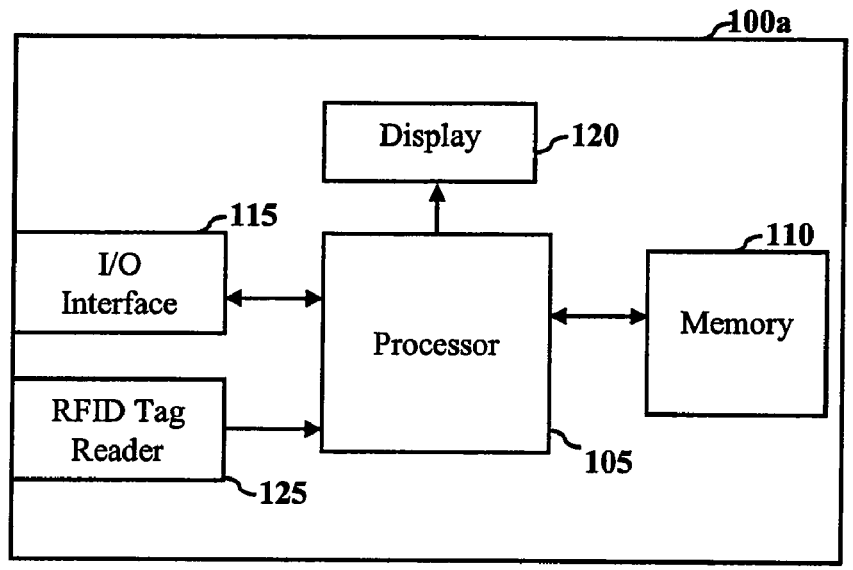
FIGS. 1A-1B depict simplified block diagrams of a controller according to one or more embodiments of the invention.
Figure 1B:
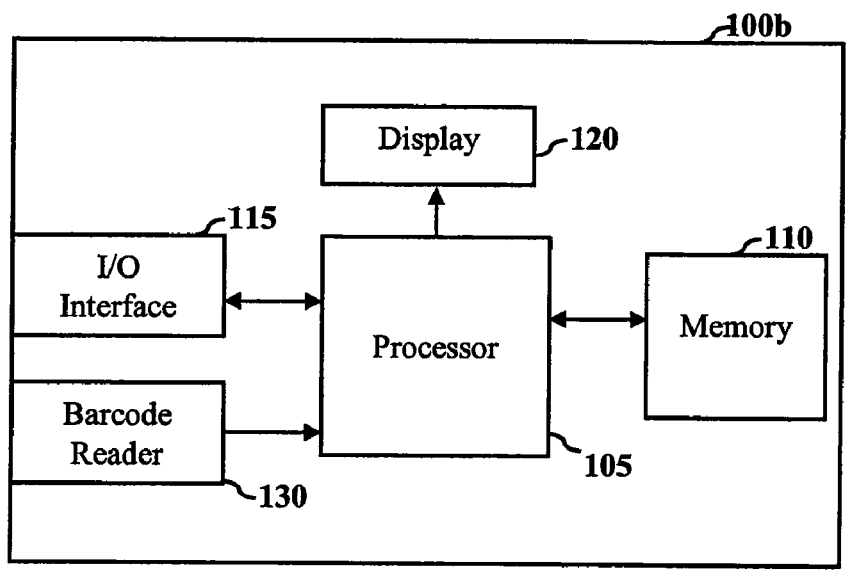

Referring now to the drawings, FIGS. 1A-1B depict simplified block diagrams of a controller according to one or more embodiments of the invention. Referring first to FIG. 1A, controller 100a is shown including a processor 105 coupled to memory 110, input/output (I/O) interface 115, display 120 and RFID tag reader 125. Processor 105 may be configured to execute one or more commands stored in memory 110 to operate controller 100a. Processor 105 can be any type of processor such as a microprocessor, field programmable gate array (FPGA) and/or application specific integrated circuit (ASIC). Memory 120 may be any type of memory, such as ROM and RAM memory.

According to one embodiment, RFID tag reader 125 may be configured to detect at least one RFID tag associated with a surveying tool. Similarly, RFID tag reader 125 may be configured to detect data related to the surveying tool provided by an RFID tag that is associated with the tool. Data provided by the RFID tag may relate to an identifier, an identification code, manufacturer, model number, data protocol, communication frequency, communication channel, services, modulation schemes, antenna requirements, encryption data/keys and capabilities of the surveying tool etc. According to another embodiment, RFID tag reader 125 may be configured to detect a user identification code as will be described below in more detail with respect to FIGS. 5A-5B.

According to another embodiment of the invention, processor 105 may be configured to receive data associated with an identification tag. As such, processor 105 may present an indicator to an operator of the controller using display 120. Similarly, display 120 can present a user interface for operating controller 100a. Detected identification tags may be stored in and/or compared to records provided by memory 110. As such, processor 105 can determine if controller 100a can interoperate with a surveying tool associated with the identification data. For detected identification tags not recognized by processor 105, connection with a communications network may be made using I/O interface 115 for download of any necessary configuration data for a detected identification tag. In that fashion, controller 100a can be configured to interoperate with a surveying tool associated with a detected identification tag. I/O interface 115 may provide communications functions for wired and/or wireless communication. According to another embodiment, I/O interface 115 may provide at least one terminal to receive user commands. For example, controller 105a may include a keypad including a plurality of input terminals. Further, I/O interface 115 may be configured to output an audible alert when prompted by processor 105.

Referring now to FIG. 1B, controller 100b is another embodiment of controller 100a in which a barcode reader 130 is used instead of the aforementioned RFID tag reader 125. According to one embodiment, barcode reader 130 may be configured to detect at least one barcode tag associated with a surveying tool. Similarly, barcode reader 130 may be configured to detect data related to the surveying tool. For example, barcode reader 130 can detect data provided by the barcode tag. Data provided by the barcode tag may relate to an identifier, an identification code, manufacturer, model number, data protocol, communication protocol, services and capabilities of the surveying tool etc. It should also be appreciated that barcode reader 130 may be configured to detect two-dimensional barcodes according to another embodiment of the invention. According to another embodiment, barcode reader 130 may be configured to detect a user identification code as will be described below in more detail with respect to FIGS. 5A-5B.

As shown in FIG. 1B, barcode reader 130 is integrated with controller 100b. In one embodiment, a user may activate barcode reader 130 using a terminal provide by I/O interface 115. According to another embodiment, an auxiliary barcode reader may be coupled to controller 100b by I/O interface 115. An operator of the controller 105 may benefit from an auxiliary barcode reader when controller 100b is coupled to a support device.

Figure 2:
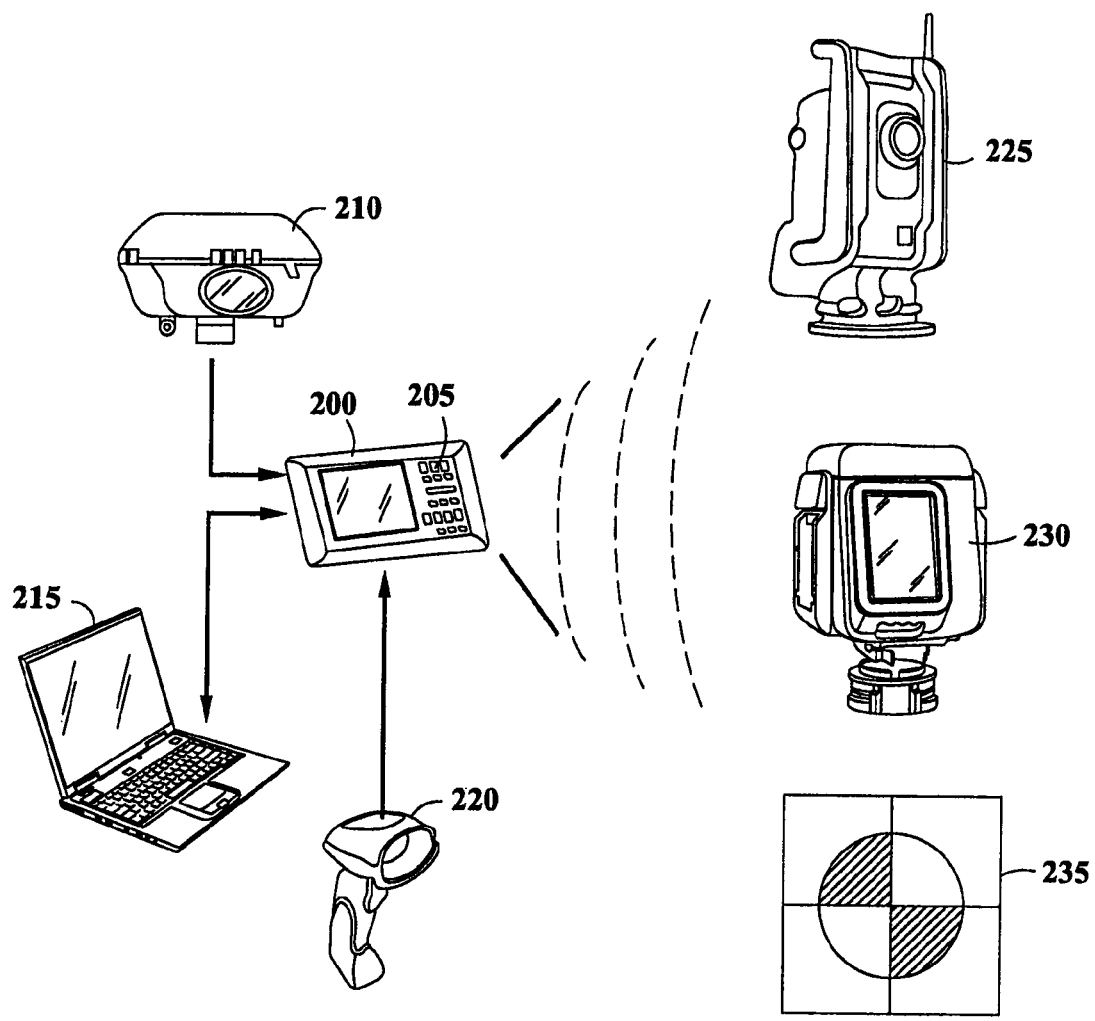
FIG. 2 depicts embodiments of a system which may employ the controller of FIGS. 1A-1B according to one or more aspects of the invention.

Referring now to FIG. 2, a system is shown which may employ the controller of FIGS. 1A-1B according to one or more embodiments of the invention. As shown in FIG. 2, a controller 200 (e.g., controller 100a or 100b) may be configured to detect an identification tag associated with one of a total station 225, spatial imaging scanner 230 and survey target 235. It should also be appreciated that controller 200 may be configured to detect any type of surveying tool in general labeled with an identification tag. Further, controller 200 may be configured to detect a user identification code associated with a user profile. According to one embodiment, controller 200 may include an RFID tag reader (e.g., RFID tag reader 125) configured to detect an RFID tag associated with any of total station 225, spatial imaging scanner 230 and survey target 235. It may also be appreciated that controller may include a barcode tag reader (e.g., barcode tag reader 130) configured to detect a barcode tag associated with any of total station 225, spatial imaging scanner 230 and survey target 235. In that fashion, operation of controller 200 may be configured to interoperate with any of total station 225, spatial imaging scanner 230 and survey target 235. Detection of a plurality of identification tags by controller 200 may be performed in series or in parallel. Similarly, configuration of controller 200 to interoperate with a plurality of survey tools associated with identification tags may be performed in series or in parallel.

According to another embodiment, controller 200 may be configured based on detecting a series of identification tags. Further, detecting a series of tags by controller 200 may initiate a certain operation or mode for the controller. As such, controller 200 may generate a usage scenario based on detecting a series of identification tags. In one embodiment, a usage scenario may provide a description of a combined use of devices associated with detected identification tags. According to another embodiment, controller 200 may be configured to provide information for describing use of devices when a series of identification tags are detected. For example, controller 200 may provide usage information on performing a real time kinematic (RTK) global positioning measurement.

As shown in FIG. 2, controller 200 includes keypad 205 which may be useable to enter commands for controller 200. According to another embodiment, controller 200 may be coupled to a global positioning system (GPS) receiver 210 by one of a wired and/or wireless connection. Controller 200 may be configured to integrate one or more signals received from GPS receiver 210 with measurements provide by at least one of total station 225 and spatial imaging scanner 230. Controller 200 may also be coupled to an external computing device 215. As such, measurements received by controller 200 from a surveying tool may be provided for analysis and/or integrated with a surveying application. Additionally shown in FIG. 2, controller 200 may be coupled to an optional auxiliary barcode reader 220. Auxiliary barcode reader 220 may be coupled to controller 200 by an I/O interface (e.g., I/O interface 115).

According to another embodiment, controller 200 may be configured to interoperate with surveying tools which may not be pre-configured for operation. For example, some surveying devices may comprise input/output ports which may not be configured for operation with controller 200. In one embodiment, controller 200 may be configured to detect one or more settings and/or requirements to interface with a surveying device provided by an identification tag of the surveying device. In an exemplary embodiment, total station 225 may comprise a serial port for receiving binary data, such as an RS-232 port. In order for controller 200 to interoperate with total station 225 via the serial port, one or more settings of total station 225 would be required. In the RS-232 port example, at least one of a baud rate, start/stop bits and/or parity setting would be required for the controller 200 to interoperate with total station 225. In another embodiment of the invention, an information tag associated with total station 225 may store one or more settings for a port of total station 225. Controller 200 may be configured to detect one or settings to interoperate with total station 225.

Figure 3:
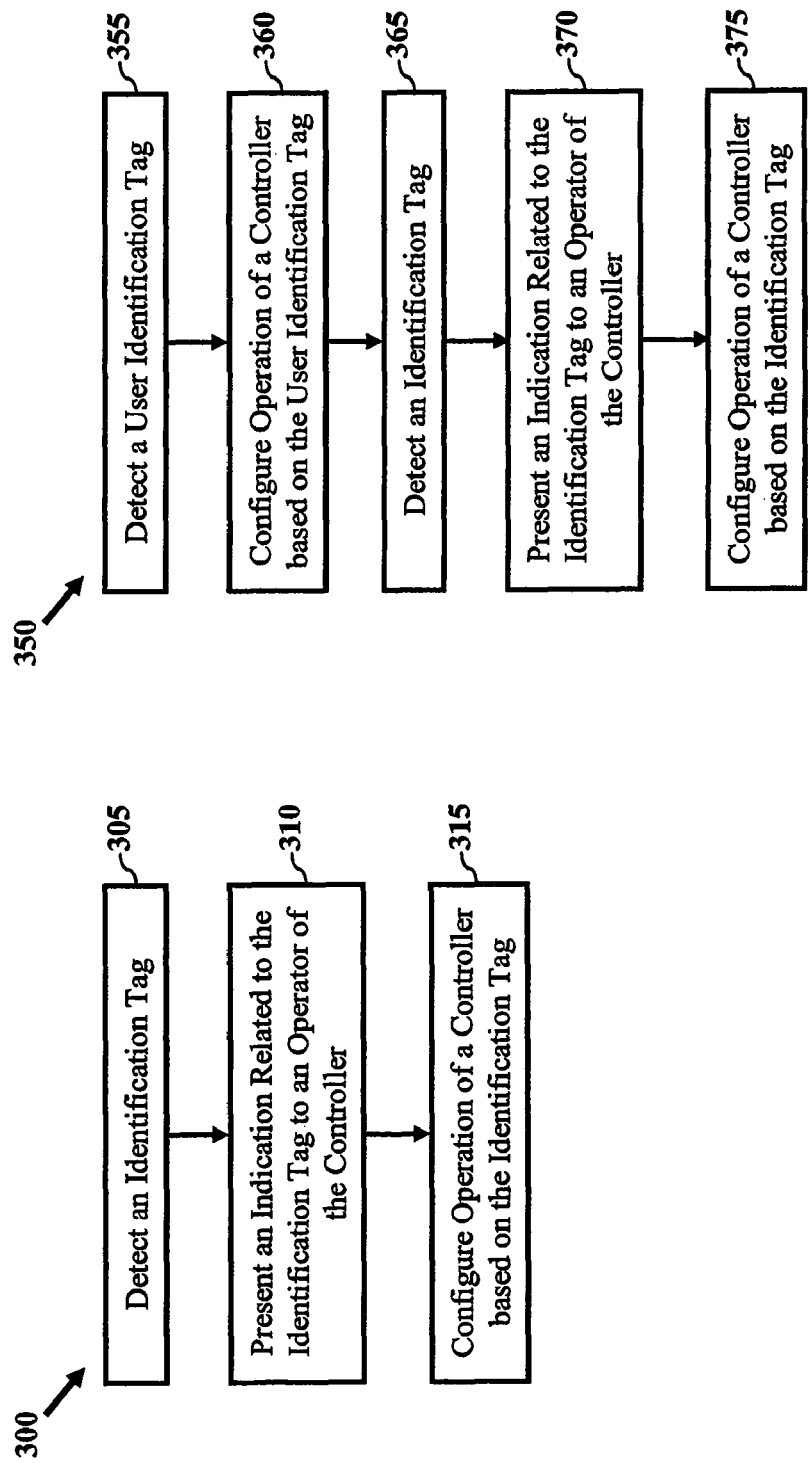
FIGS. 3A-3B depict processes according to one or more embodiments of the invention.

Referring now to FIGS. 3A-3B, processes are shown for configuring a controller according to one or more embodiments of the invention. Referring first to FIG. 3A, process 300 may be initiated by detecting an identification tag at block 305. At block 310, an indicator, related to the identification tag, may be presented to an user of the controller (e.g., controller 100a or 100b). In one embodiment, the indicator may relate to a notification provided by a controller display (e.g., display 120). At block 315, operation of the controller may be configured based on the identification tag. While process 300 is described in relation to a single identification tag, it should be appreciated that a plurality of identification tags may be detected. Similarly, operation of the controller may be configured based on a plurality of identification tags according to another embodiment of the invention.

Referring now to FIG. 3B, process 350 may be initiated by detecting a user identification tag at block 355. A user identification tag may relate to a single user, a predefined user interface profile, a training mode identifier, etc. At block 360, operation of the controller (e.g., controller 100a or 100b) may be configured based on the detected user identification tag. For example, when the detected user identification tag relates to a particular user, the graphical user interface provided by the controller may be formatted according to pre-set user specifications as will be described in more detail with reference to FIGS. 5A-5B. Process 350 can detect an identification tag at block 365. An indicator, related to the identification tag, may be presented to a user of the controller at block 370. According to another embodiment, user identification tag may be associated with a fixed set of survey tools. As such, process 350 may only indicate survey tools associated with a detected user identification tag. In one embodiment, the indicator may relate to a notification provided by a controller display (e.g., display 120). At block 375, operation of the controller may be configured based on the identification tag. For example, the controller can be configured to interoperate with surveying tool. Similarly, a user interface of the controller may be presented according to user profile associated with a user identification tag. According to another embodiment, configuring operation of the controller at block 375 may be based on detection of a plurality of identification tags.

Figure 4:
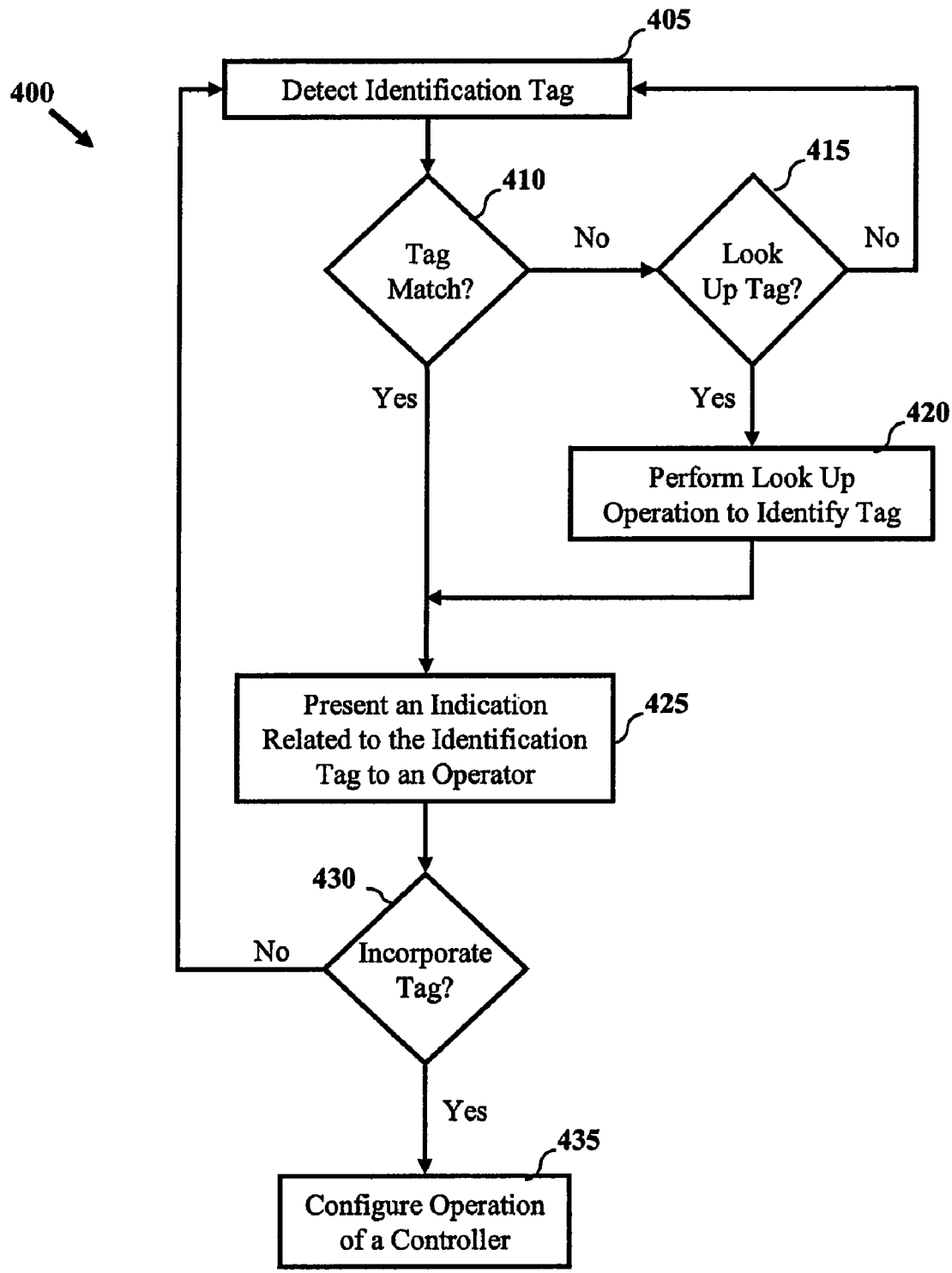
FIG. 4 depicts a graphical representation of a controller configuration process according to one or more embodiments of the invention.

Referring now to FIG. 4, a graphical representation is shown of process 400 for configuring a controller (e.g., controller 100a or 100b) according to one or more embodiments of the invention. Process 400 may be initiated by detecting an identification tag at block 405. It may be appreciated that the identification tag detected at block 405 may be associated with surveying tool and/or may relate to a user identification tag. According to one embodiment of the invention, process 400 may determine if the identification tag detected at block 405 matches surveying tools and/or users stored in a controller memory (e.g., memory 110). When the detected identification tag is recognized by the controller ("Yes" path out of decision block 410), an indication related to the identification tag may be presented at block 425. When the detected identification tag is not recognized by the controller ("No" path out of decision block 410), process 400 may determine whether a look-up operation of the detected identification tag should be performed. For example, the controller may request if the user requires connection to a data communication network, or external computing device, to retrieve data associated with the detected tag. When a look-up operation is not requested ("No" path out of decision block 415), process 400 can check for identification tags at block 405. When a look-up operation is requested ("Yes" path out of decision block 415), a look-up operation may be performed by the controller to retrieve data associated with detected identification tag.

Process 400 continues with presenting an indication related to the identification tag at block 425. Process 400 may determine whether the identification tag is to be incorporated by the controller at block 430. When the detected tag is not to be integrated ("No" path out of decision block 430), process 400 may follow by checking for identification tags at block 405. When detected tag is to be integrated ("Yes" path out of decision block 430), process 400 can configure operation of the controller at block 435.

Figure 5B:
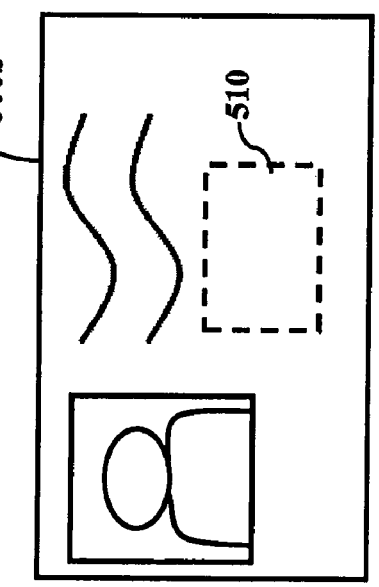
FIGS. 5A-5B depict graphical representations sources of an identification tag which may be employed by the controller of FIGS. 1A-1B according to one or more embodiments of the invention.
Figure 5A:
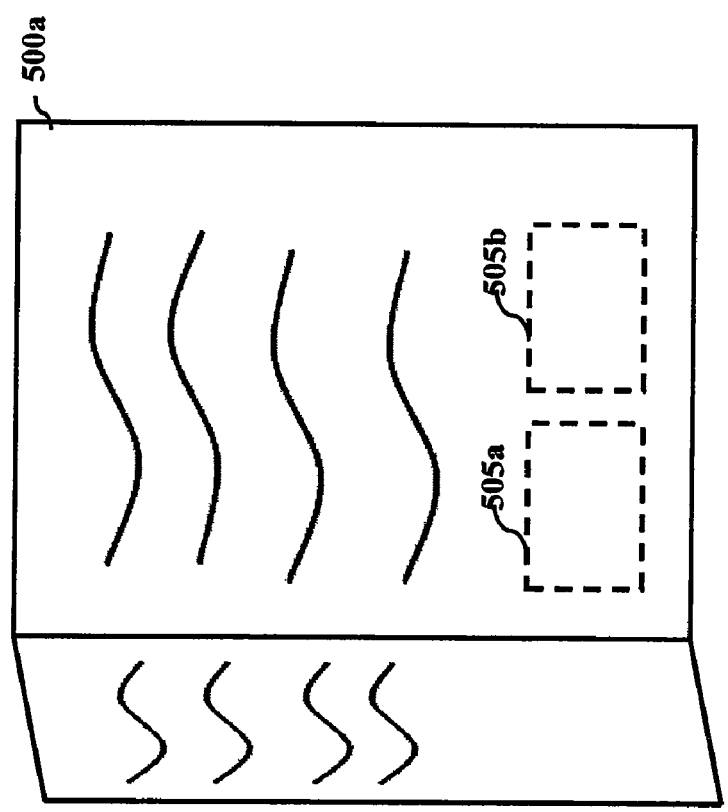

Referring now to FIGS. 5A-5B, identification tags are shown which may be detected by the controller of FIGS. 1A-1B according to one or more embodiments of the invention. Referring first to FIG. 5A, identification tags 505a and 505b may provided by a publication 500a, such as a controller manual, training manual, pocket reference, etc. Identification tags 505a and 505b may relate to one of a RFID tag and a barcode tag. As such, a user of the controller (e.g., controller 100a or 100b) can detect one of the identification tags 505a and 505b to configure the controller. For example, when publication 500a relates to a training manual, identification tag 505a can be detected to configure the controller with particular settings an/or enter a training mode. According to another embodiment, identification tag 505a may provide a network address for a network site providing up-to-data configuration and/or tutorial data. It may also be appreciated that a controller (e.g., controller 100a or 100b) may access the network site based on data provided by identification tag 505a.

Referring now to FIG. 5B, user identification tag 510 is shown according to one of more embodiments of the invention. As shown in FIG. 5B, user identification tag 510 may be integrated with an identification card 500b. The user identification tag 510 may relate to one of a RFID tag and a barcode tag. As such, a user of the controller (e.g., controller 100a or 100b) can detect user identification tag 510 to configure the controller. For example, when identification card 500b is scanned by the controller, the controller may be formatted according to a pre-defined user profile. According to one embodiment, user profiles may provide information related to one or more of controller options that are available in a software program, layout of features with a controller interface and which services a user may be permitted to access. According to another embodiment, identification tag 510 may provide one or more scenario profiles for certain operations of the controller.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Trademarks and copyrights referred to herein are the property of their respective owners.

What is claimed is:

1. A method for configuring a controller of geographic surveying equipment, the method comprising the acts of:
   detecting by the controller an identification tag associated with a geographic surveying tool;
   determining if the identification tag detected by the controller is associated with one or more of a surveying tool and user stored in memory of the controller;

presenting an indicator relating to the identification tag to a controller user; and configuring controller operation based, at least in part, on the identification tag, wherein configuring the controller includes configuring the controller to interoperate with the surveying tool.

2. The method of claim 1, wherein the identification tag is one of a radio frequency identification tag and a barcode tag.

3. The method of claim 1, wherein the indicator is at least one of a controller display visual notification and an audible tone.

4. The method of claim 1, further comprising detecting data provided by the identification tag, wherein the data comprises at least one surveying tool characteristic.

5. The method of claim 1, further comprising detecting a user identification tag associated with the identification tag.

6. The method of claim 5, wherein configuring the controller includes configuring the controller user interface based on a user profile associated with the user identification tag.

7. The method of claim 1, further comprising detecting at least one additional identification tag associated with at least on additional surveying tool.

8. The method of claim 7, wherein, further comprising configuring the controller to interoperate with the additional surveying tool based, at least in part, on the additional identification tag.

9. The method of claim 1, further comprising integrating measurement data received from the surveying tool.

10. A geographic surveying equipment controller comprising:
 a display;
 a tag reader configured to detect an identification tag associated with a geographic surveying tool;
 a processor coupled to the display and the tag reader, the processor configured to:
  determine if the identification tag detected by the tag reader is associated with one or more of a surveying tool and user stored in memory of the controller;
  present an indicator relating to the identification tag to a controller user; and
  configure controller operation based, at least in part, on the identification tag, wherein configuring the controller includes configuring the controller to interoperate with the surveying tool.

11. The controller of claim 10, wherein the identification tag is one of a radio frequency identification tag and a barcode tag.

12. The controller of claim 10, wherein the indicator is at least one of a controller display visual notification and an audible tone.

13. The controller of claim 10, wherein the tag reader is further configured to detect data provided by the identification tag, wherein the data comprises at least one surveying tool characteristic.

14. The controller of claim 10, wherein the tag reader is further configured to detect a user identification tag associated with the identification tag.

15. The controller of claim 14, wherein configuring the controller includes configuring the controller user interface based on a user profile associated with the user identification tag.

16. The controller of claim 10, wherein the tag reader is further configured to detect at least one additional identification tag associated with at least on additional surveying tool.

17. The controller of claim 16, wherein, further comprising configuring the controller to interoperate with the additional surveying tool based, at least in part, on the additional identification tag.

18. The controller of claim 10, wherein the processor is further configured to integrate measurement data received from the surveying tool.

* * * * *